United States Patent [19]

Bohme et al.

[11] 4,108,620
[45] Aug. 22, 1978

[54] DEVICE FOR THE SEPARATION OF GASEOUS MIXTURES INTO COMPONENTS OF DIFFERENT MOLECULAR MASS

[75] Inventors: Gotthold Bohme, Oberursel; Erich Robens, Friedrichsdorf; Horst Binder, Karben-Petterweil; Dieter Langbein, Bad Homburg, all of Fed. Rep. of Germany

[73] Assignee: Battelle-Institut e.V., Frankfurt am Main, Fed. Rep. of Germany

[21] Appl. No.: 680,083

[22] Filed: Apr. 26, 1976

[30] Foreign Application Priority Data

Apr. 24, 1975 [DE] Fed. Rep. of Germany ....... 2518201

[51] Int. Cl.² ............................................. B01D 45/14
[52] U.S. Cl. ............................................. 55/210; 55/17; 55/267; 55/403; 55/407; 55/470; 55/DIG. 14; 310/67 R; 415/122 A; 417/420
[58] Field of Search ...................... 55/3, 17, 100, 267, 55/400, 403, 406, 407, 470, DIG. 14, 210; 415/90, 122 A; 417/352, 356, 420; 310/66, 67 R

[56] References Cited

U.S. PATENT DOCUMENTS

| 2,422,882 | 6/1947 | Bramley | 55/17 |
| 2,629,330 | 2/1953 | Meline | 310/67 R |
| 2,733,857 | 2/1956 | Beams | 417/420 |
| 2,918,208 | 12/1959 | Becker | 415/90 |
| 3,107,310 | 10/1963 | Carriere et al. | 417/420 |
| 3,289,925 | 12/1966 | Zippe et al. | 55/406 |
| 3,535,052 | 10/1970 | Becker | 415/90 |
| 3,826,588 | 7/1974 | Frank | 415/90 |

FOREIGN PATENT DOCUMENTS 152,643  3/1921  United Kingdom .......................... 55/3

Primary Examiner—Frank W. Lutter
Assistant Examiner—David L. Lacey
Attorney, Agent, or Firm—Fisher, Christen & Sabol

[57] ABSTRACT

A device for the separation of gaseous mixtures into components of differing molecular mass. The device is designed according to the principle underlying a turbine or a turbomolecular pump. The device has a rotor that is equipped with discs made of magnetic material having blades at their periphery and is installed in a stationary casing having a gaseous mixture inlet and at least two gas outlets connected to a gas delivery tube, and to whose inside wall stator discs are attached between the rotor discs. The device further has voltage means. The gas delivery tube has controls connected thereto which keep the total pressure in the gaseous mixture below 10 Pa.

12 Claims, 3 Drawing Figures

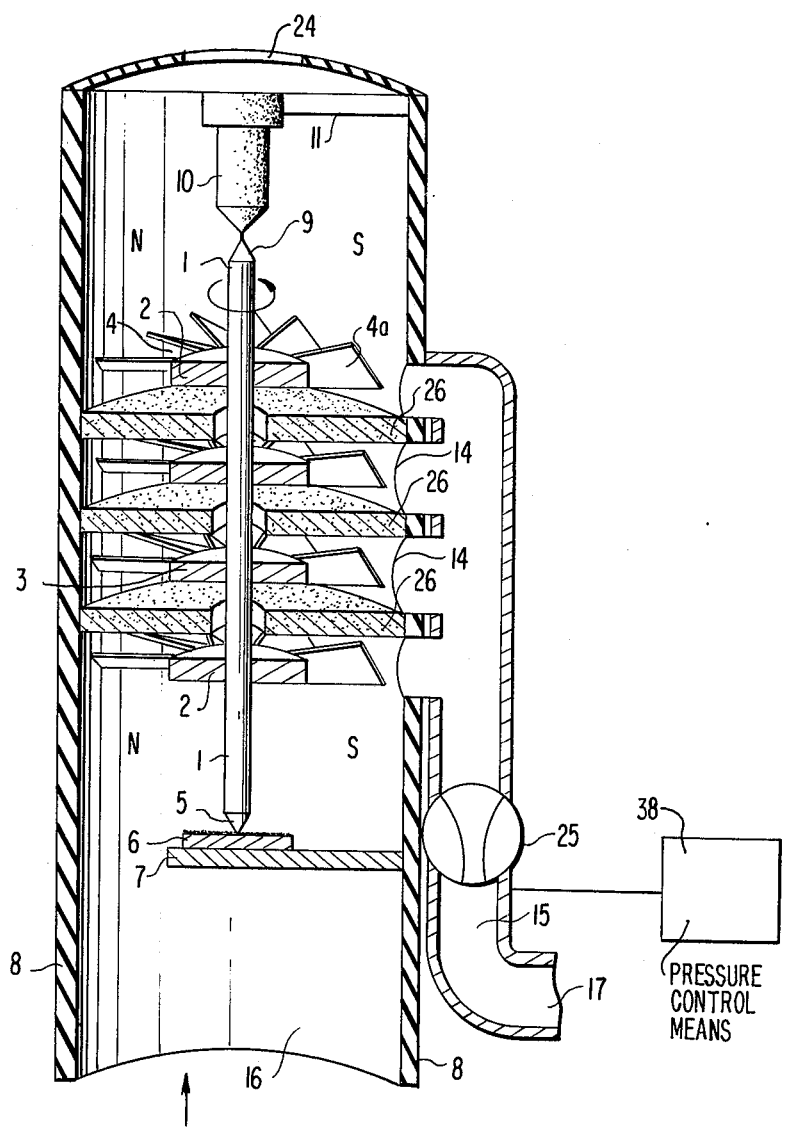
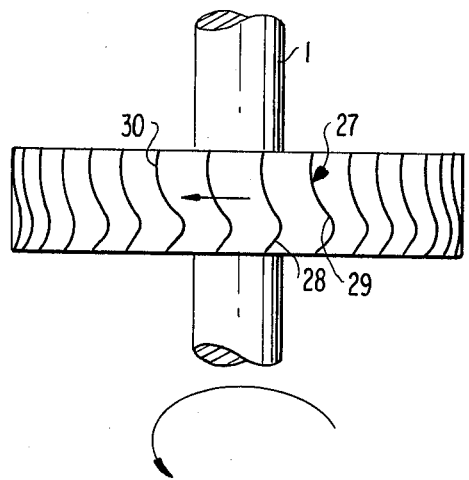

DEVICE FOR THE SEPARATION OF GASEOUS MIXTURES INTO COMPONENTS OF DIFFERENT MOLECULAR MASS

BACKGROUND OF THIS INVENTION

1. Field of This Invention

This invention relates to separation devices by which gaseous mixtures, in particular mixtures of gaseous isotopes, can be separated into their components of different molecular mass.

2. Description of the Prior Art

Mass-dependent radial separation effects in thermal flows in the acceleration field are already being used for isotope separation in the so-called gas centrifuges. Typical gas centrifuge designs are described by K. Cohen and G. M. Murphy, "The Theory of Isotope Separation as Applied to the Large-scale Production of $U^{235}$," New York, McGraw-Hill, (1951), p. 103 ff, and by R. Schutte, "Diffusionstrennverfahren", Ullmanns Enzyklopadie der Technischen Chemie, Fourth Ed., Vol. 2, Weinheim, Verlag Chemie, (1972), p. 630 ff.

The rotor of gas centrifuges is a hollow body into which the gas is introduced axially for separation. As a result of axial temperature differences, which are adjusted at the hollow body, the gas moves in a circulatory convective flow in the acceleration field of the rotating hollow body. The partially separated gas fractions are removed at two differently located outlets and fed to the other separation devices. The separation efficiency of these gas centrifuges is relatively low, particularly because the peripheral velocity is limited for reasons of material to about $700 \, m \cdot s^{-1}$ (at a diameter of 400 mm, this corresponds to 600 revolutions per second). Construction of the centrifuges is extremely expensive; the material used must meet very high requirements.

H. Zeibig describes in his dissertation ["Isotopentrennung von Gasen durch Thermodiffusion mit einer in einem geschlossenen Gehaeuse rotierenden Scheibe," (trans.: Isotope Separation of Gases by Thermodiffusion Using a Disc Rotating in a Closed Casing), Technische Hochschule Aachen, (1966)] the radial separation effect at a smooth disc which is cooler than the casing. One of the drawbacks of this design is that the maximum separation effect is reached at speeds between 2 and 6 revolutions per second, so that only low acceleration fields can be used and the separation effect is relatively small.

It has also been suggested to make use of the different suction capacities of a trubomolecular pump for gases of different weight to reduce the partial pressure of the air in a helium-air mixture [W. Becker, "Erhochung der Empfindlichkeit des Helium-Lecksuchers durch Verwendung einer Turbomolekularpumpe besonderer Konstruktion," (trans.: Increasing the Sensitivity of a Helium Leak Detector by Using a Turbomolecular Pump of a Special Design), Vakuumtechnik, Vol. 17, (1968) pp. 203–205]. This method provides for the use of the turbomolecular pump at speeds of up to 270 rps for evacuating the mass spectrometer tube; the passage of helium in the direction opposite to the pumping direction is slightly impeded, i.e., that the passage has dimensions (diameter, wall distance) which are comparable or larger than the mean free path of helium at the applied pressure. An essential drawback of this method is the fact that the axle at the fore-vacuum flange of the turbomolecular pump has oil lubricated bearings, whereby the gas in that area is contaminated with oil vapor. With such device, the gas mixture can be separated to a substantial degree only if the components differ widely in molecular mass.

BROAD DESCRIPTION OF THIS INVENTION

An object of this invention is to create a device for the separation of gaseous mixtures into components of different molecular mass which, while having a simple design, has a comparatively high separation efficiency, so that the gaseous mixtures can be separated economically. A further object of this invention is to provide a device that is also suitable for use with highly corrosive gases such as $UF_6$. Other objects and advantages of this invention are set out herein or are obvious herefrom to one ordinarily skilled in the art.

The objects and advantages of this invention are achieved by the device and process of this invention.

This invention involves a device for the separation of gaseous mixtures into components of differing molecular mass. The device is designed according to the principle underlying a turbine or a turbomolecular pump. The device has a rotor that is equipped with discs having blades at their periphery and is installed in a stationary casing to whose inside wall stator discs are attached between the rotor discs. The rotor serves at the same time as the rotor of an electric motor whose stator coils are arranged at the outside wall of the casing. The gas delivery tube is connected with controls which keep the total pressure in the gaseous mixture below 10 Pa.

The device according to this invention resembles in its basic design a turbine or a turbomolecular pump, but there are fundamental differences in design features and operation. Depending on the design and size of the device, speeds of up to 5,000 rps are used. The pressure at the gas inlet and outlet openings is kept constant. Furthermore, it is important that — contrary to conventional turbomolecular pumps — there are no bearings in the entire path of the gas mixture which would have to be lubricated; contamination of the gas mixture by the lubricant is therefore impossible.

The design of the device according to this invention is simple and sturdy. Since the device needs no separate motor and has no ball bearings or other complicated bearings and no liquid lubricants, only few materials are exposed to the gas, which facilitates the corrosion-resistant implementation of the device according to this invention.

As explained in the following portion of this specification, the device according to this invention uses axial and radial effects — singly or in combination — in mechanically or thermally induced flows. The design and operation of the device according to this invention lead in a way to an optimization of the different separation effects, which results in a high overall separation efficiency and an economical mode of operation. Because of the above optimization effects, the energy consumption is also low compared with conventional methods.

Advantageously, the stator discs have slits or indentations at their periphery which form blades. In another design, the stator discs are designed as discs extending to the rotor axle and consisting of a material which is porous, e.g., porous oxide ceramic. Such design of the stator discs constitutes an additional important enrichment of the technique since this feature contributes to a further substantial increase in the economic efficiency of this entire separation process. Advantageously, the blades at the rotor discs and/or the stator discs have slopes in the conveying direction of the gaseous mixture, or such profiles that molecules of different molecular mass are deflected and conveyed differently. For this purpose, the profile of the blades at the rotor discs and/or stator discs having first an ascending and then a descending slope followed by an approximately horizontal part in axial direction. This results in another substantial increase in the economic efficiency of this separation process. Advantageously, the rotor and the casing form part of an electronically controlled, collectorless direct-current motor, described in detail later in this application, where at least some of the rotor discs consist of ferromagnetic material and are diametrically and permanently magnetized, whereas the casing consists of a non-conducting (preferably ceramic) material and the stator discs consist of a non-ferromagnetic material (preferably ceramic material or light metal). Advantageously, the rotor axle has conical bearings on one or both ends whose bearing shells consist of a self-lubricating solid and are provided with an attenuator. Advantageously, the rotor is arranged vertically and the bottom bearing can be relieved by a magnet installed above the top of the axle. Advantageously, the device has gas inlet or gas outlet openings at the ends of the rotor and in the wall of the casing between the stator discs. Advantageously, the device is provided in addition with heating and cooling equipment by means of which temperature differences in axial and radial direction can be set.

DETAILED DESCRIPTION OF THIS INVENTION

Other characteristics, advantages and possible applications of this invention emerge from the following explanations which refer to the attached, schematically simplified drawings that represent embodiments of this invention.

In the drawings:

FIG. 2 is a vertical axial section of a perspective view of another embodiment of this invention; and FIG. 3 is a side view of a stator disc with specially designed stator blades.

Figure 1:
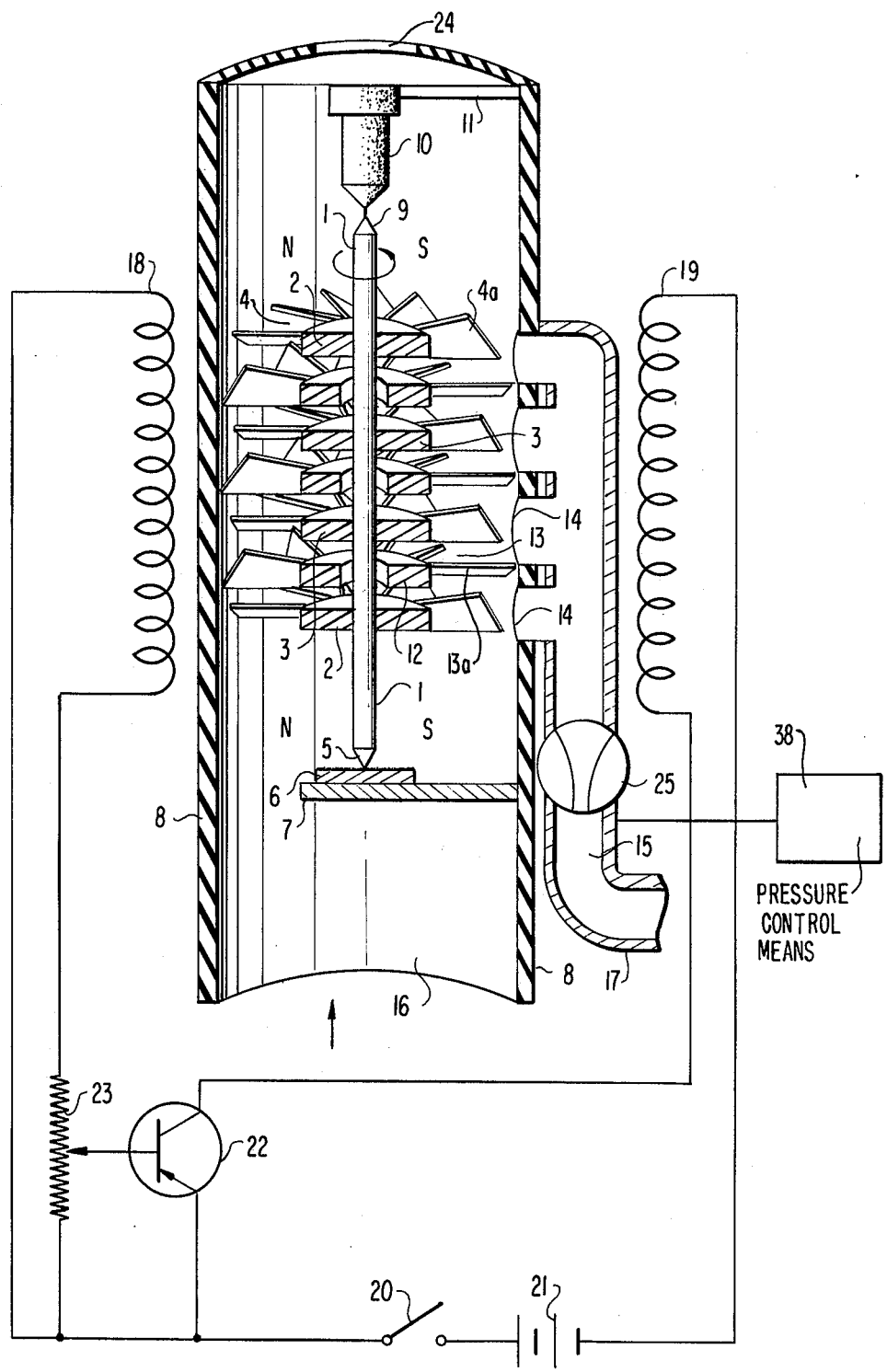
FIG. 1 is a vertical axial section of a perspective view of one embodiment of this invention.

According to FIG. 1, the device according to this invention consists essentially of one vertically arranged, carefully balanced disc-carrying rotor and cylindrical casing 8. Axle 1 of the rotor in this embodiment is 100 mm long and is made of stainless steel. On axle 1 there are two diametrically and permanently magnetized 1-mm thick rotor discs 2, each having a diameter of 30 mm. Discs 2 are made of a ferromagnetic material. On axle 1 of the rotor there are in addition several non-magnetized discs 3, which are made of a non-ferromagnetic alloy.

All of rotor discs 2 and 3 are provided at their edges with spaced blades 4a defining radial, oblique slits or indentations 4, between adjacent blades 4a. Rotor discs of this design are easy to fabricate and mechanically very stable.

Lower end 5 or rotor axle 1 rests on bearing disc 6, which is a self-lubricating material, in this case polyimide in a metal matrix, which is attached to casing 8 by means of mounting 7, which is a corrosion-resistant material. Mounting 7 contains an attenuator which is not shown. At a distance of about 1 mm above the upper end 9 of axle 1 is located permanent magnet 10, which is also attached to casing 8 by means of mounting 11 containing an attenuator (again not shown).

Cylindrical casing 8, in which the rotor is located, consists of a non-conducting material, e.g., sintered aluminum oxide. Between individual discs 2 and 3, on rotor axle 1, stator discs 12, made of a non-conducting material, e.g., aluminum oxide, are attached to the inside wall of casing 8. In the embodiment represented in FIG. 1, stator discs 12 are provided with blades 13a defining radial oblique slits 13, between adjacent blades 13a which are the same as the blades 4a of rotor discs 2, but positioned in opposite direction, as rotor discs 2. On the level of rotor discs 2 and 3, casing 8 has openings 14 for gas removal. Openings 14 are connected via delivery tube 15 to gas outlet 17, which can be connected alternatively with gas entrance 16 or gas outlet 24. Pump 25 is intalled in this delivery tube and pressure control means 38 is connected to delivery tube 15 in order to keep the total pressure in the gaseous mixture below 10 Pa.

For a clearer representation of the design of the device according to the invention, the scale in the figure has been somewhat distorted. The distance between the discs in this embodiment is in actuality 1 mm. In other embodiments of this invention, the distance may range between about 0.1 and 20 mm.

Rotor 1 is driven by a magnetic moment generated between coil 19 and diametrically magnetized discs 2 on the rotor. After the rotor has been started rotating by repeated flipping of switch 20, which turns the current taken from d.c. source 21 on or off, rotating magnetized rotor discs 2 induce a current in coil 18 which, after rectification and amplification with the aid of transistor 22, is fed to coil 19. In principle, this apparatus is an electronically controlled, collectorless d.c. motor; the rotor thus serves at the same time as rotor of this electronic motor and as rotor of the separation device.

The rotary movement of the rotor produces a magnetic moment that is synchronous with the rotation and has an accelerating effect on magnetised rotor discs 2. The rotor is accelerated until the mechanical and electromagnetic resistances prevent further acceleration and a constant speed is reached. This speed can be varied by controlling variable resistor 23. In a practical application of this invention, speeds of up to 5,000 rps have been reached.

The rotor and the casing are connected with conventional (not shown) equipment (heating and cooling systems and electric resistance heater) for thermostatting the device and for keeping the desired temperature or temperature differences constant. In this embodiment provision has been made for setting specific temperature differences radially as well as axially with respect to the rotor and the casing.

For the operation of the device according to this invention, the rotor has been accelerated to a speed of up to 5000 rps in order to produce optimum separation effects. The lighter gas components are enriched at gas exit 24. Heavy components are collected at the periphery of rotor discs 2 at gas outlet openings 14 and at entrance 16. Enrichment and separation increased with the speed of the rotor.

When the casing was heated to a temperature above that of the rotor, lighter components were enriched at the periphery of rotor discs 2 and 3. The separation effect in axial direction is increased by increased heating of casing 8 in the direction of gas entrance 16. By reversing the temperature gradient, enrichment of lighter components at gas exit 24 is achieved. The maximum separation effects have been found to occur at a pressure of about 1 Pa.

The device according to FIG. 2 differs from that represented in FIG. 1 only in the design of the stator discs. While the stator discs according to FIG. 1 are provided with radial blades at their periphery, similar to the rotor discs, the stator discs according to FIG. 2 are solid discs 26 that extend to rotor axle 1. To allow passage of the gas molecules, the discs consist of a porous material, e.g., porous oxide ceramic. During operation of the device, i.e., in the separation process, the molecules pass through these pores; in this way the pressure rise caused by the rotor is reduced. If the porosity of stator discs 26 is properly selected, this pressure rise can even be cancelled completely. The use of such porous stator discs 26 prevents a major pressure rise within the separation device, which finally leads to a further substantial increase in gas throughput, as compared with blade-equipped stator discs 12 according to FIG. 1. At the same time, porous stator discs 26 bring about a homogeneous speed distribution of the gas molecules before the next rotor disc, so that this rotor disc can then further enrich the gas mixture with the same separation factor as the ones before.

The special design of rotor blades 27 shown in FIG. 3 results in a further increase in the separation efficiency at a small pressure rise within the device, as discussed in the following paragraphs. Rotor blades 27 show first an ascending slope 28 in the axial direction, i.e., in upward direction in FIG. 3, and then descending slope 29, followed by a horizontal part 30. The short arrow in FIG. 3 symbolises the direction of motion of blades 27 of rotating rotor disc 2 or 3, which are in front in the drawing. The molecules which pass in the upward direction from one chamber through the rotor disc into the next chamber, are caught directly by the ascending slope of blade 28 and on the average slower molecules of the heavy isotope are more likely than the lighter ones to receive an additional impulse and be carried further. In the further course of the upward flow of the gas, the blade with its descending slope 29 effects a reduction of the pressure rise caused by ascending slope 28. In horizontal part 30, the molecules in the rotor system again assume an isotropic velocity.

Thus, the blade shape shown in FIG. 3 produces heavy-isotope enrichment of the gas mixture transported behind the rotor disc and at the same time prevents a strong increase in pressure which would have a negative effect on the gas throughput. Furthermore, an approximately isotropic velocity distribution in the gas mixture is reestablished before the next disc is reached, so that the next separation stage can achieve approximately the same separation factor as the preceding one.

The separation effect of the stator discs can be explained in a similar fashion if one starts out from the relative velocity of the gas with respect to the rotor discs or rotor blades. Molecules which diffuse from the top downward, i.e., opposite to the conveying direction, into the rotor disc, assume at first, in the horizontal part of blades 27, a velocity which is isotropic with respect to the disc system. Thus, the slope of the rotor blade has little or no separation effect on the molecules flowing back.

It can be seen without any difficulty that similar desired effects (depending on the purpose of the device and the type of gas to be separated) result if the stator blades are designed similarly to rotor blades 27 of FIG. 3. However, the best separation effect is achieved if the porous stator discs of FIG. 2 are used in combination with rotor blades shaped according to FIG. 3.

What is claimed is:

1. A device for separation of gaseous mixtures into components of differing molecular mass, comprising:
   (a) a generally cylindrical stationary casing having a gaseous mixture inlet and at least two gas outlets for the separated gas components;
   (b) a rotor axle mounted within said casing coincident with its longitudinal axis;
   (c) a plurality of spaced apart rotor discs attached to said rotor axle and extending radially therefrom, each of said rotor discs having blades at their periphery and at least two said rotor discs being formed of magnetic material;
   (d) a plurality of spaced apart stator discs attached to the interior of said casing, extending radially inwardly between said rotor discs;
   (e) an electrical power source;
   (f) current amplification and retification means connected to said power source and to an electrical coil;
   (g) said electrical coil being connected to said electrical power source and disposed adjacent the exterior of said housing such that electrical current passing through said coil generates a magnetic moment in said rotor discs of magnetic material so as to rotate said rotor axle and said rotor discs;
   (h) delivery tube means connected to one of said at least two gas outlets; and
   (i) control means connected to said delivery tube means and which keeps the total pressure in the gaseous mixture below 10 Pa.

2. A device according to claim 1, wherein the stator discs have blades at their periphery.

3. A device according to claim 1, wherein the stator discs extend inwardly to, but do not touch, the rotor axle and are made of a porous material, whereby there is communication between both sides of the stator discs due to their porosity.

4. A device according to claim 3 wherein the material is porous oxide ceramic.

5. A device according to claim 4 wherein the rotor axle has concial bearings on at least one end whose bearing shells are of a self-lubricating material.

6. A device according to claim 3 wherein said at least two rotor discs are made of ferromagnetic material and are diametrically and permanently magnetized; the casing is made of a non-conducting material; and the stator discs are made of a non-ferromagnetic material.

7. A device according to claim 6 wherein the non-conducting material is a ceramic material and wherein said non-ferromagnetic material is a ceramic material.

8. A device according to claim 7 wherein said gaseous mixture inlet and one of said at least two gas outlet openings is located in an end of the casing and another one of said at least two gas outlet opening is in the wall of the casing adjacent the stator discs.

9. A device according to claim 6 wherein the rotor is arranged vertically and further comprising a magnet attached to said casing above the top of the axle to relieve the load on the lower rotor axle bearing.

10. A device according to claim 6 wherein said non-ferromagnetic material is a light, non-ferrous metal.

11. A device according to claim 1, wherein the blades of the rotor discs have slopes and the profile of the blades of the rotor discs first having an ascending slope and then a descending slope followed by an approximately horizontal part in the axial direction, such that molecules of different molecular mass are deflected and conveyed differently.

12. A device according to claim 1 wherein said stator discs have blades thereon, said blades having slopes and the profile of the blades first have an ascending slope and then a descending slope followed by an approximately horizontal part in the axial direction, such that molecules of different molecular mass are deflected and conveyed differently.

* * * * *